United States Patent [19]

Noto et al.

[11] Patent Number: 4,708,220
[45] Date of Patent: Nov. 24, 1987

[54] POWER STEERING CONTROL APPARATUS

[75] Inventors: Yasuo Noto; Shun-ichiro Sugimoto, both of Katsuta, Japan

[73] Assignees: Hitachi, Ltd.; Fuji Heavy Industries, Ltd., both of Tokyo, Japan

[21] Appl. No.: 712,030

[22] Filed: Mar. 15, 1985

[30] Foreign Application Priority Data

Mar. 16, 1984 [JP] Japan .................................. 59-49260

[51] Int. Cl.$^4$ ............................................. B62D 5/04
[52] U.S. Cl. .................................... 180/142; 180/79.1; 364/424
[58] Field of Search ...................... 180/79.1, 142, 148, 180/143; 318/256; 364/424

[56] References Cited

U.S. PATENT DOCUMENTS

| 4,471,280 | 9/1985 | Stack .................................... 180/79.1 |
| 4,476,529 | 10/1984 | Nakamura et al. .................. 180/142 |
| 4,509,611 | 4/1985 | Kade et al. .......................... 180/79.1 |
| 4,530,413 | 7/1985 | Buike et al. .......................... 180/79.1 |
| 4,538,698 | 9/1985 | Hashimoto et al. ................. 180/142 |
| 4,541,499 | 9/1985 | Yanai et al. .......................... 180/142 |

FOREIGN PATENT DOCUMENTS

| 644611 | 7/1962 | Canada ............................... 180/79.1 |
| 2313706 | 9/1974 | Fed. Rep. of Germany ..... 180/79.1 |
| 0076760 | 6/1980 | Japan .................................. 180/79.1 |

Primary Examiner—David M. Mitchell
Assistant Examiner—Mitchell J. Hill
Attorney, Agent, or Firm—Antonelli, Terry & Wands

[57] ABSTRACT

A power steering control apparatus includes apparatus for detecting a steering force applied to a steering wheel of a vehicle, an actuator controllable in accordance with an output of the steering force detecting apparatus and apparatus for detecting a steering angle, and the actuator is controlled in accordance with the steering angle and the steering force such that an assistant restoring force corresponding to the steering angle is applied to the steering wheel.

7 Claims, 11 Drawing Figures

POWER STEERING CONTROL APPARATUS

BACKGROUND OF THE INVENTION

The present invention relates to power steering systems for use with automobiles and the like and more particularly to a power steering system which has excellent steering feeling.

In the case of automotive vehicles or the like whose user classes cover many divergencies, presently the provision of power steering is the practice with vehicles of large and small sizes and power steering is useful in reducing the fatigue of the driver and thereby ensuring safe driving.

The power steering systems heretofore known in the art have been mainly of the hydraulically operated type. In recent years, however, electrically-operated power steering systems have been proposed by noting their substantial control contents and merits from the standpoint of energy saving.

Of these electrically-operated power steering systems, those which have been used mainly are of the type in which an electric motor is employed as an electrically-operated actuator so as to produce a large operating force required for the actuator and its output is slowed down to obtain a final operating force for steering assisting purposes.

In the conventional electrically-operated power steering systems, the assistant steering force is provided by the electric motor operated at a high speed through the reduction mechanism. On the other hand, the electric motor involves an inertial resistance due to the mass of the armature (rotor) and also the reduction mechanism includes a train of gears thereby causing a large mechanical resistance in turning the output shaft of the reduction mechanism. Therefore, in the case of FIG. 1, there is a disadvantage that if a motor 7 is not energized, there is no action of any assistant steering force so that, due to the previously mentioned inertial resistance and mechanical resistance, a large force is required for turning a steering wheel 1, that is, the steering wheel 1 becomes heavy and the steering wheel restoring performance is deteriorated thus causing characteristics which are quite undesirable from the standpoint of steering feeling to appear in the operation of the steering wheel.

As regards these undesirable characteristics, particularly those undesirable characteristics from the standpoint of steering feeling which manifest in the operation of the steering wheel due to the inertia of the electric motor, as proposed for example in Japanese Laid-Open patent application No. 55-76760, etc., it is conceivable to use a method of providing a differential characteristic in the control of the electric motor and this method is expected to have a considerable steering feeling improving effect. With this method, however, the provision of an additional differentiation circuit is required so that the provision of the differential characteristic further requires another consideration with respect to noise thus tending to increase the cost and no improving effect is expected with respect to the deterioration of the steering feeling due to the previously mentioned frictional resistance. Thus, on the whole, this method is not capable of improving the steering feeling satisfactorily. It is to be noted that the deterioration of the steering feeling due to the frictional resistance takes the form of a decrease or complete loss of the restoring force which should essentially be produced at the steering angles other than the zero steering angle (neutral position).

SUMMARY OF THE INVENTION

It is an object of the invention to provide a power steering control apparatus which overcomes the foregoing deficiencies in the prior art and which, despite being power-operated one, ensures a satisfactory restoring force and improves the steering feeling considerably.

Thus, the present invention features that the steering angle which is given to the steerable wheels, etc., of an automotive vehicle is detected and an actuator is controlled in accordance with the steering angle in relation with the turning force applied to the steering wheel thereby providing an assistant restoring force.

BRIEF DESCRIPTION OF THE DRAWINGS

The above and other objects, features and advantages of the present invention will be more clear from the following description with reference to the accompanying drawings, in which.

DESCRIPTION OF THE PREFERRED EMBODIMENTS

A power steering control apparatus according to the invention will now be described in greater detail with reference to the illustrated embodiment.

Figure 1:
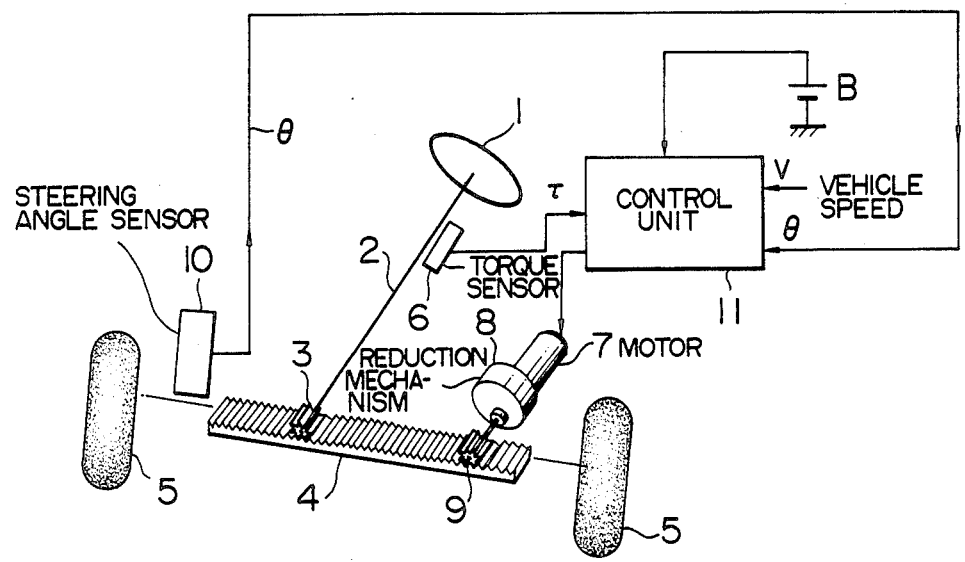
FIG. 1 is a system diagram showing the construction of an embodiment of a power steering control apparatus according to the invention.

Referring to FIG. 1 illustrating an embodiment of the invention in which the invention is applied to an electrically-operated power steering system for automotive vehicles, numeral 1 designates a steering wheel, 2 a steering shaft, 3 a pinion, 4 a rack, 5 tires (wheels) which are to be steered, 6 a torque sensor, 7 a power-assisting electric motor, 8 a reduction mechanism, 9 a pinion, 10 a steering angle sensor, and 11 a control unit. Designated at B is a battery for power supply purposes.

This embodiment is of the so-called rack and pinion type in which the steering force applied to the steering wheel 1 by the driver is transmitted to the rack 4 from the steering shaft 2 through the pinion 3 and the tires 5 are turned to the desired steering angle.

Figure 2:
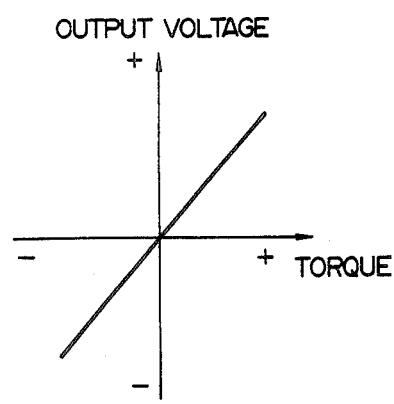
FIG. 2 is a characteristic diagram of the torque sensor.

The torque sensor 6 functions so that when the steering wheel 1 is turned by the driver, the torque applied to the pinion 3 from the steering wheel 1 through the steering shaft 2 is detected and a signal $\tau$ indicative of the magnitude of the torque is generated. The torque sensor 6 may for example be composed of a strain gage attached to the steering shaft 2 or a variable resistor or the like for detecting the amount of torsion of a torsion spring mechanism attached to the steering shaft 2 and it has such a characteristic as shown in FIG. 2.

The electric motor 7 is operable as an electrically-operated actuator which applies an assistant steering force to the rack 4 through the reduction mechanism 8 including a gearing or the like and the pinion 9. The actuator can also take the form of an hydraulic servo motor.

Figure 3:
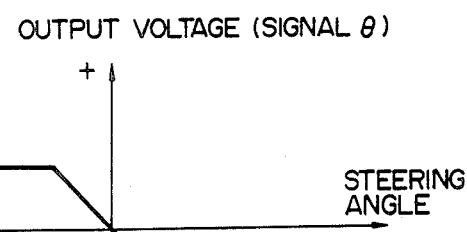
FIG. 3 is a characteristic diagram of the steering angle sensor.

The steering angle sensor 10 functions so that the steering angle (turning angle) of the tires 5 is detected and then a signal $\theta$ indicative of the steering angle is generated in accordance with such a characteristic as shown in FIG. 3 with the zero steering angle being indicative of the straight ahead movement of the vehicle or the neutral position of the turning angle of the tires 5, and the sensor 10 is composed of a rotary encoder including a variable resistor for detecting the rotational angle of a member which is movable in response to the turning of the tires 5 or a linear encoder for detecting the movement of a member which makes a linear motion.

Figure 4:
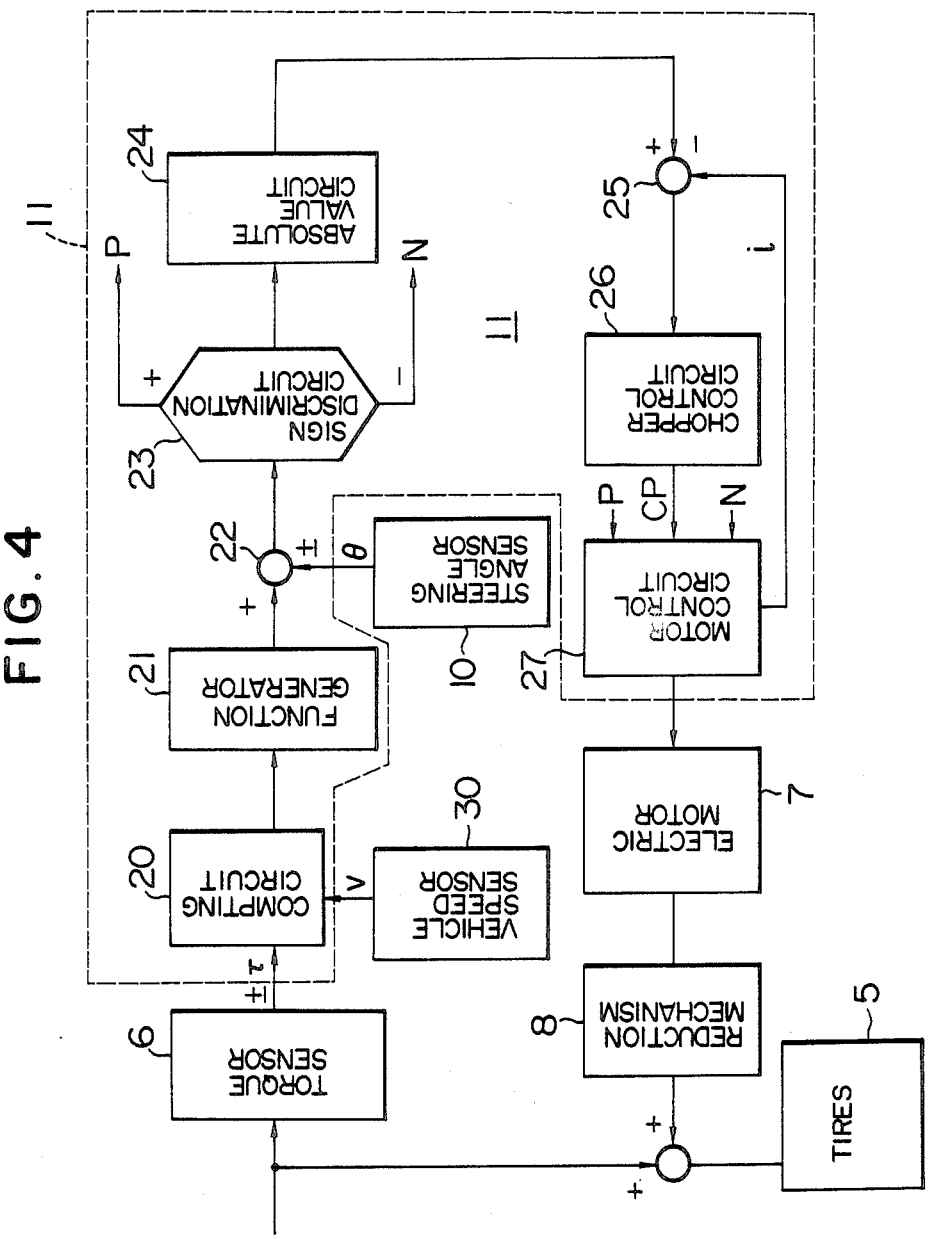
FIG. 4 is a block diagram showing an embodiment of the control unit.

FIG. 4 shows an embodiment of the control unit 11 which includes a computing circuit 20, a function generator 21, adders 22 and 25, a sign discrimination circuit 23, an absolute value circuit 24, a chopper control circuit 26, a motor control circuit 27, etc.

The operation of the apparatus will now be described.

When the steering wheel 1 is turned by the driver so that a torque is applied to the steering shaft 2, the torque is detected by the torque sensor 6 in accordance with the characteristic of FIG. 2 and a torque signal $\tau$ is generated.

The torque signal $\tau$ is applied to the chopper control circuit 26 through the computing circuit 20, the function generator 21, the adder 22, the sign discrimination circuit 23, the absolute value circuit 24 and the adder 25 so that the torque signal $\tau$ is converted to pulse signals CP having a duty cycle corresponding to its absolute value. In this case, the sign discrimination circuit 23 is responsive to the sign of the applied signal to generate one or the other of a positive signal P and a negative signal N and the signal P or N is applied to the motor control circuit 27.

It is to be noted that the polarity of the torque signal $\tau$ generated from the torque sensor 6 is such that the signal has for example a positive polarity in response to a torque produced when the steering wheel 1 is turned to the right (clockwise) and a negative polarity in response to a torque produced when the steering wheel 1 is turned to the left (counterclockwise). Thus, the vehicle is turned to the right when the torque signal $\tau$ is positive and the vehicle is turned to the left when the torque signal $\tau$ is negative.

Figure 5:
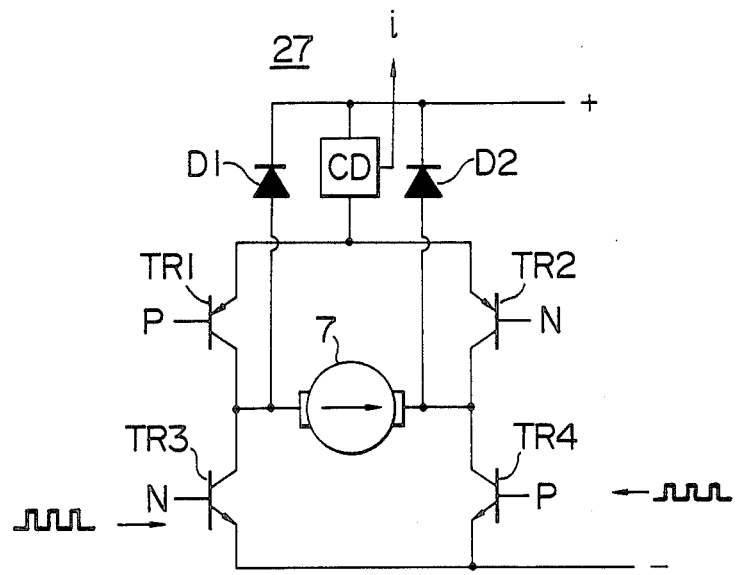
FIG. 5 is a circuit diagram showing an embodiment of the electric motor control circuit.

Referring now to FIG. 5, there is illustrated an embodiment of the motor control circuit 27 including four power transistors TR1 to TR4 (hereinafter simply referred to as TR1 to TR4), free-wheel diodes D1 and D2 and a current detector CD.

In the circuit 27, a positive signal P is supplied to the base of the TR1 and a negative signal N is supplied to the base of the TR2. A signal indicative of the logical product of the negative signal N and pulse signals CP is supplied to the base of the TR3 and a signal indicative of the logical product of the positive signal P and the pulse signals CP is supplied to the base of the TR4. Thus, when the positive signal P is generated or when the torque signal $\tau$ has a positive polarity, the TR1 and TR4 are turned on so that a current is supplied to the motor 7 in the direction of an arrow and the magnitude of the current is controlled by the duty cycle of the pulse signals CP. When the torque signal $\tau$ has a negative polarity or the negative signal N is generated, the TR2 and TR3 are turned on so that a current is supplied to the motor 7 in a direction opposite to the direction of the arrow and the value of the current is likewise controlled by the duty cycle of the pulse signals CP.

In either one of these cases, the magnitude of the current flowing to the motor 7 is detected by the current detector CD and supplied as a current signal i to the adder 25 thereby forming a feedback loop for accurately supplying to the motor 7 a current corresponding to the signal generated from the absolute value circuit 24.

Note that the diodes D1 and D2 function so that a circulation path is provided when the TR3 and TR4 are respectively subjected to chopper control and turned off by the pulse signals CP.

Therefore, when the steering wheel 1 is turned by the driver, a current of a given value is supplied from a given direction to the motor 7 in accordance with the direction and magnitude of the turning force (steering force) applied to the steering wheel 1 so that the torque produced by the motor 7 is applied to the rack 4 by way of the pinion 9 and an assistant steering force is provided, thus serving the function of the power steering system.

Figure 6:
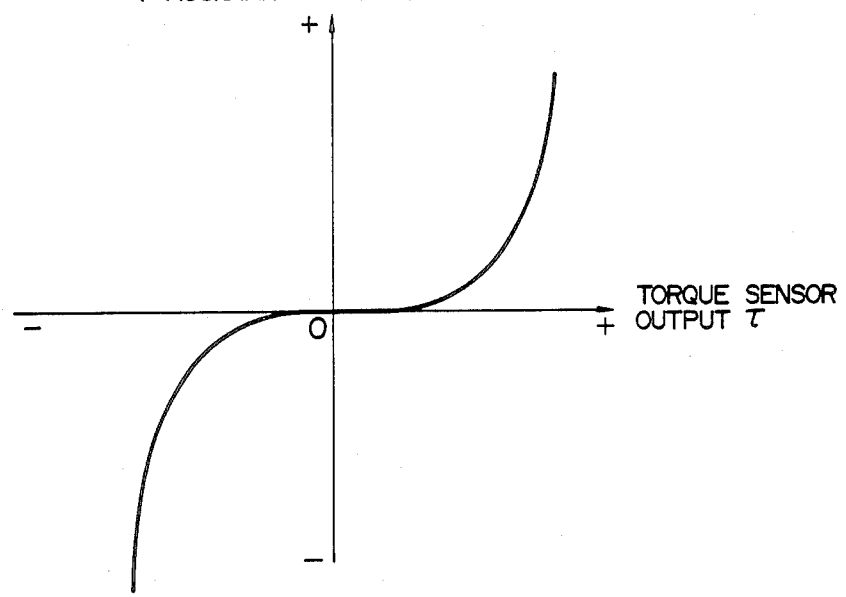
FIG. 6 is a characteristic diagram showing an example of a higher-order functional characteristic.

In this connection, it is known that the driving tends to become hard if the magnitude of the steering force required for the driver to turn the steering wheel 1 is excessively small and therefore experimentally it is convenient from the standpoint of steering feeling to design so that the assistant steering force or the value of current to the motor 7 is determined with the signal $\tau$ representative of steering force from the torque sensor 6 in accordance with a higher-order functional characteristic having an offset as shown in FIG. 6. That is, the function with offset provides a dead region of the assistant steering force with respect to the steering force and an increasing ratio of the assistant steering force to the steering force with an increase of the steering force.

Figure 7:
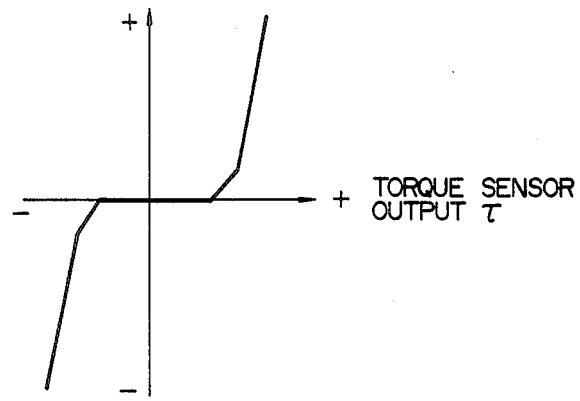
FIGS. 7 and 8 are diagrams for explaining approximate characteristics of the higher-order functional characteristic.
Figure 8:
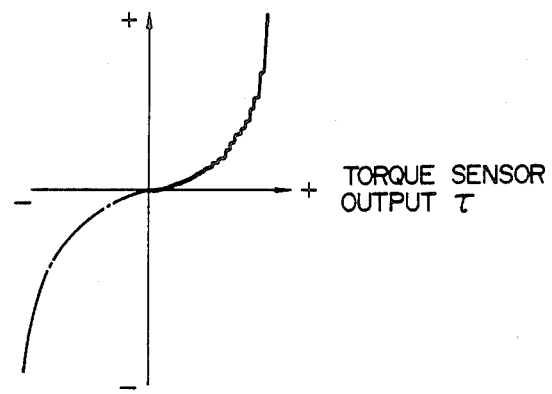

For this purpose, the function generator 21 is provided so that an output signal is generated in response to an input signal in accordance with the characteristic of FIG. 6. It is to be noted that actually the provision of a function generator having such a smooth characteristic as shown in FIG. 6 increases the cost or cannot be realized and therefore it is sufficient to use the function generator 21 utilizing a broken-line approximation as shown in FIG. 7. Also, the function generator 21 can be provided by utilizing a step approximation as shown in FIG. 8 in place of the brokenline approximation.

Then, the force required for steering the tires 5 or a so-called steering force is determined by the friction resistance in the turning direction between the tires and the running road surface and this frictional resistance is varied with the vehicle speed, that is, it is decreased with an increase in the vehicle speed. Thus, the steering force is increased with a decrease in the vehicle speed so that in the case of a so-called stationary steering, which means that the steering wheel is operated when the vehicle is stopped, made when the vehicle speed is zero, the steering force is usually increased so much that it is practically impossible to turn the steering wheel.

Then, from the practical point of view, the stationary steering operation is necessary during the garaging or parallel parking of a vehicle.

On the other hand, decrease in the steering wheel turning force at high speeds is rather dangerous and therefore it is desirable to decrease or stop the assistant steering force at high speeds.

Figure 9:
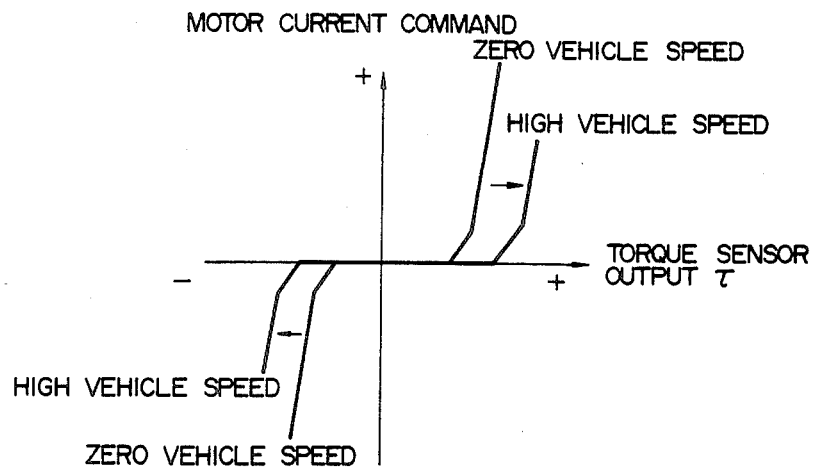
FIG. 9 is a diagram showing an example of the characteristic provided by the embodiment of the invention.

For this purpose, the computing circuit 20 is provided so that a vehicle speed signal v is received from a vehicle speed sensor designated at 30 and a specific computational operation is performed on the torque signal $\tau$ thereby increasing the offset range of the characteristic provided by the function generator 21 in accordance with the vehicle speed signal v as shown in FIG. 9.

Figure 10:
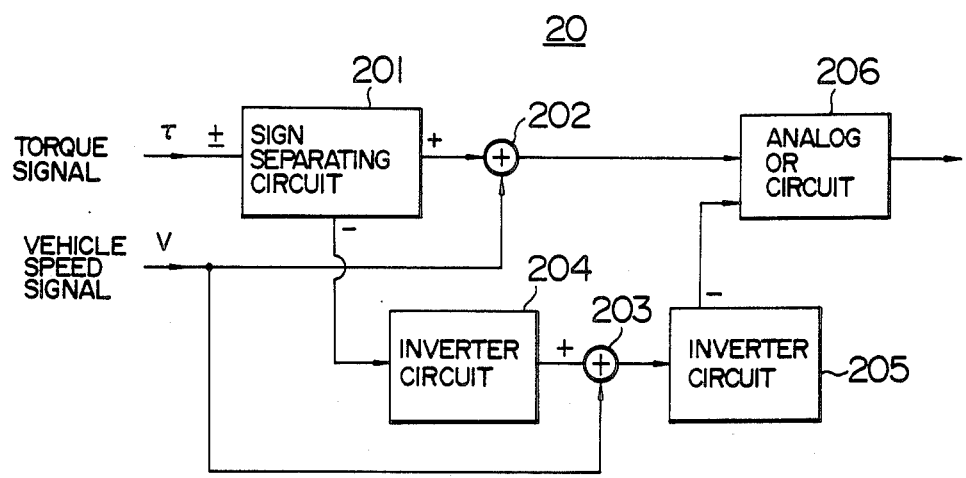
FIG. 10 is a block diagram showing an embodiment of the computing circuit.

FIG. 10 shows an example of the computing circuit 20 and it includes a sign separating circuit 201, adders 202 and 203, inverter circuits 204 and 205 and an analog OR circuit 206. While the computing circuit 20 basically functions as an adder for the signals $\tau$ and v, the value of the torque signal $\tau$ can be both positive and negative and thus the sign separating circuit 201 descriminates between the positive and negative polarities of the signal. Therefore, when the torque signal $\tau$ has a positive polarity, it is subtracted as such from the signal v in the adder 202, whereas when the signal $\tau$ has a negative polarity, it is first converted to the positive polarity by the inverter circuit 204, and then a subtraction of the signal v is made in the adder 203 and again passed through the inverter circuit 205 thereby restoring it to the original polarity.

As mentioned previously, an important point for determining the steering feeling of the power steering equipped steering systems is whether the normal restoring characteristic is retained.

In other words, it is the general practice with the steering systems for vehicles to provide the desired restoring characteristic by utilizing the caster effect of the steerable wheels and the like. Therefore, after the desired steering angle has been provided by turning the steering wheel, the driving operation utilizing the restoring force imparted to the steering wheel by the restoring characteristic is used widely and this is the point which ensures a good steering feeling. Thus, it is necessary to design so that the restoring force is not lost by the provision of the power steering.

Figure 11:
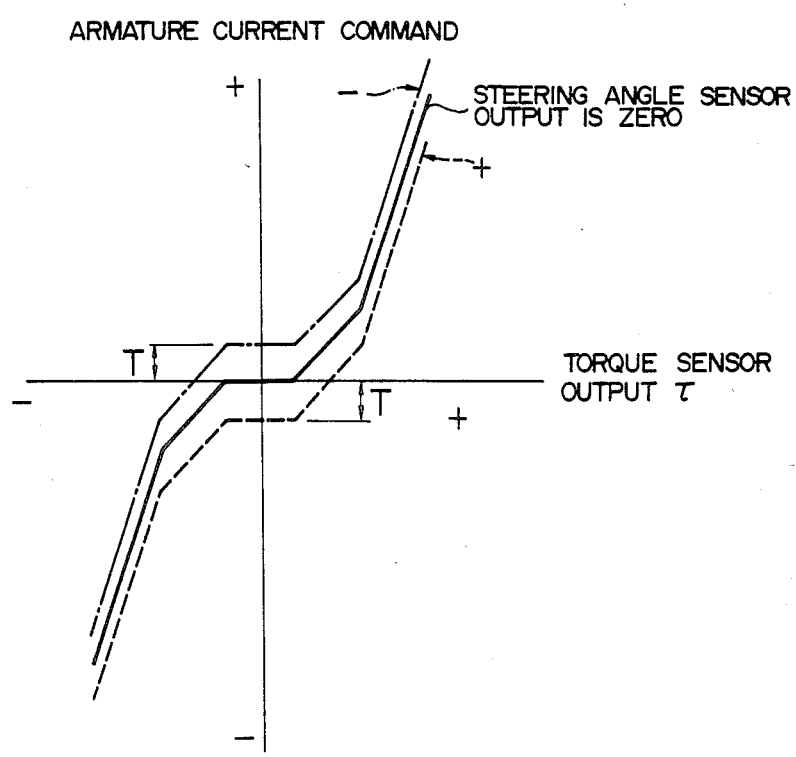
FIG. 11 is a characteristic diagram for explaining the operation of the embodiment of the invention.

Thus, the embodiment of FIG. 4 includes the adder 22 so that the signal $\theta$ from the steering angle sensor 10 is added to the output of the function generator 21 and the current characteristic of the motor 7 in relation to the torque signal $\tau$ is varied in accordance with the steering angle signal $\theta$ as a parameter thereby providing such characteristics as shown in FIG. 11.

In other words, it is designed so that the torque signal $\tau$ versus motor current characteristic is subjected to negative displacement when the steering angle signal $\theta$ has a positive polarity and to positive displacement when the signal $\theta$ has a negative polarity and that the magnitude of these displacements is proportional to the steering angle signal $\theta$ which shows a characteristic as shown in FIG. 3.

As a result, when the steering wheel 1 is turned from the neutral position to the desired steering angle position and then the grasp of the driver on the steering wheel 1 is reduced thus causing the torque signal $\tau$ to become lower than a predetermined value, a motor current flows in dependence on the direction of the then current steering angle, that is, as for example, a negative motor current flows when the steering angle is positive and a positive motor current flows when the direction of the steering angle is negative.

For example, by suitably varying the characteristic of the torque sensor 6 shown in FIG. 3 such that the magnitude of the motor current indicated at T in FIG. 11 has a value required for producing in the motor 7 a torque which is substantially equal to the sum of a frictional resistance caused when the motor 7 is idled from the rack 4 or is ineffective to cause movement of the rack through the pinion 9 and a frictional resistance of the track of the tires 5, and the reduction mechanism 8 in FIG. 1, it is possible to provide an assistant restoring force to the restoring force of the tires 5 so that the frictional resistance due to the motor 7, the reduction mechanism 8 and the pinion 9 is entirely cancelled and the restoring force of the tires 5 is retained with no decrease in the primary magnitude thereby ensuring a good steering feeling.

Thus, in accordance with this embodiment the power steering system is provided in which the provision of the power steering has the effect of decreasing the steering force without the danger of any deterioration of the restoring characteristic essential to the steering system and always ensuring a good steering feeling and moreover there are effects that the function generator 21 always provides the optimum assistant steering force and that the computing circuit 20 simplifies the stationary steering with the vehicle at rest and also ensures a satisfactory running stability at high speeds while lightening the turning of the steering wheel at low speeds.

While the above-described embodiment shows a case in which the present invention is applied to an electrically-operated power steering system, the present invention is of course not limited to it and many other changes and modifications are possible. For example, the invention may be applied to the conventional widely-used power steering system of the type which provides an assistant steering force by a hydraulic servo motor so as to provide an assistant restoring force and thereby ensure a good steering force.

From the foregoing description it will be seen that in accordance with the present invention it is possible to easily provide a power steering control apparatus which, by virtue of the provision of a power steering involving no danger of deteriorating the restoring characteristic, eliminates the deficiencies of the prior art, is light in steering wheel operation and utilizes the return of the steering wheel thereby ensuring a good steering feeling.

Although the present invention has been described in its preferred form with a certain degree of particularity, it is understood that the present disclosure of the preferred form has been changed in the details of construction, and the combination and arrangement of parts may be modified without departing from the spirit and the scope of the present invention as hereinafter claimed.

We claim:

1. A power steering control apparatus for a vehicle comprising:
    means for detecting a steering force applied to a steering wheel and providing an output signal representative of the steering force;
    means for detecting a steering angle of the vehicle wheels and providing an output signal representative of the steering angle;

an actuator operatively associated with a steering mechanism for the vehicle heels, with the steering wheel also being operativley associated with the steering mechanism; and means operatively associated with the actuator for controlling continuously the actuator in accordance with speed of the vehicle, the steering force output signal and the steering angle output signal to provide an assistant steering force and further in accordance with the steering angle output signal to provide an assistant restoring force, said controlling means controlling said actuator in accordance with a function having an offset with respect to said steering force so as to provide a dead region of said assistant steering force with respect to said steering force and an increasing ratio of said assistant steering force to said steering force with an increase of said steering force.

2. An apparatus according to claim 1, wherein means is provided for detecting running speed of the vehicle, and the range of said offset is varied in accordance with the running speed of said vehicle.

3. An apparatus according to claim 1, wherein said actuator comprises an electric motor and a reduction mechanism.

4. An apparatus according to claim 2, wherein said actuator comprises an electric motor and a reduction mechanism.

5. An apparatus according to claim 1, wherein a vehicle speed sensing means is associated with said controlling means for providing to said controlling means an output signal representative of vehicle speed to change the offset in accordance with changes in vehicle speed, whereby the assistant steering force is decreased as the vehicle speed increases.

6. A power steering control apparatus for a vehicle comprising:

means for detecting a steering force applied to a steering wheel and providing an output signal representative of the steering force;

means for detecting a steering angle of the vehicle wheels and providing an output signal representative of the steering angle;

an actuator operatively associated with a steering mechanism for the vehicle wheels, with the steering wheel also being operatively associated with the steering mechanism; and means operatively associated with the actuator for controlling continuously the actuator in accordance with speed of the vehicle, the steering force output signal and the steering angle output signal to provide an assistant steering force and further in accordance with the steering angle output signal to provide an assistant restoring force, said controlling means producing in said actuator a torque substantially equal to a sum of frictional resistance caused when said actuator is ineffective so as to provide the assistant restoring force and retain a restoring force of the vehicle wheels.

7. An apparatus according to claim 6, wherein said actuator comprises an electric motor and a reduction mechanism.

* * * * *